United States Patent

[11] 3,608,703

[72] Inventors Frank J. Hitchcock;
William L. Jones, both of Lander, Wyo.
[21] Appl. No. 26,486
[22] Filed Apr. 8, 1970
[45] Patented Sept. 28, 1971
[73] Assignee United States Steel Corporation

[54] CONVEYOR BELT PROTECTION DEVICE
8 Claims, 6 Drawing Figs.
[52] U.S. Cl. .................................................. 198/232,
198/37
[51] Int. Cl. ................................................... B65g 43/02
[50] Field of Search ........................................... 198/37,
184, 232, 192

[56] References Cited
FOREIGN PATENTS
1,228,561  11/1966  Germany...................... 198/232

Primary Examiner—Edward A. Sroka
Attorney—Martin J. Carroll

ABSTRACT: A belt conveyor has a table on which are pivotally mounted one or more idler roll assemblies in the loading zone. These assemblies have limited tilting movement away from the direction of belt approach with the tilting movement being resisted by springs. Under normal conditions there is no tilting movement, but under abnormal loads the assemblies tilt and stop the conveyor.

PATENTED SEP 28 1971
3,608,703
SHEET 1 OF 3
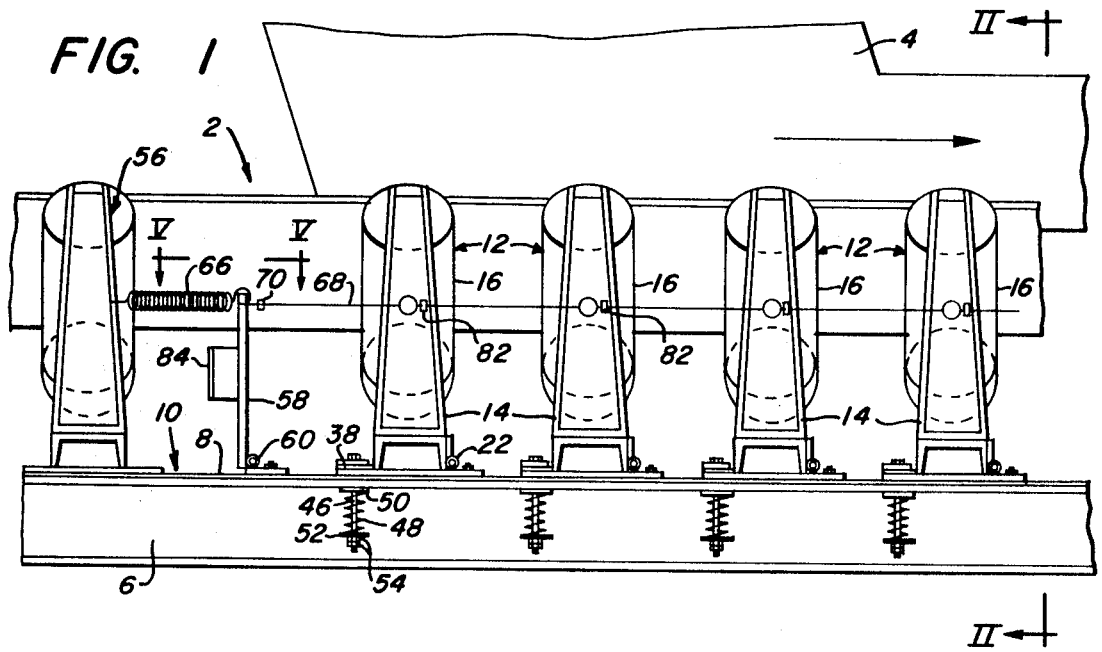
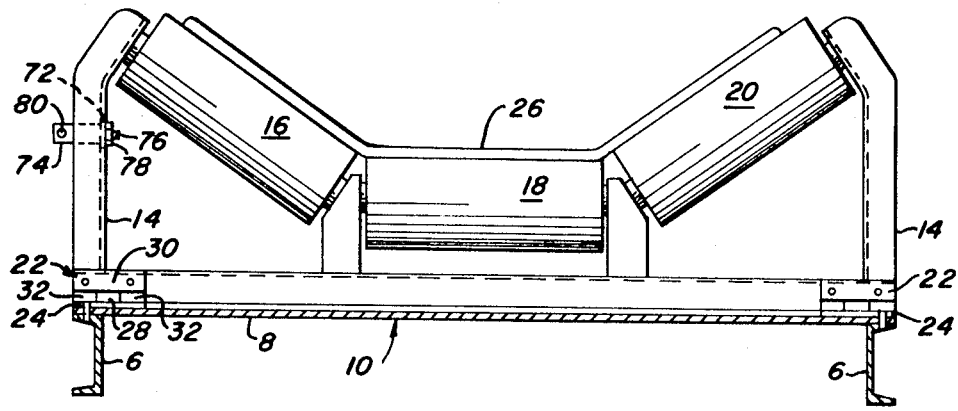
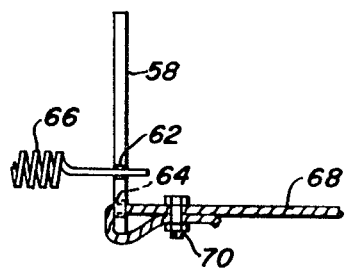
INVENTORS
FRANK J. HITCHCOCK
& WILLIAM L. JONES
By Martin J. Carroll
Attorney

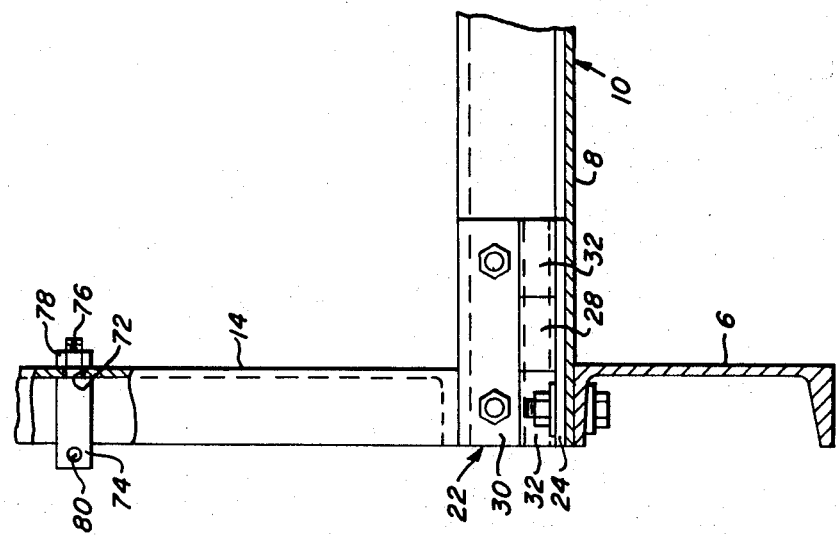
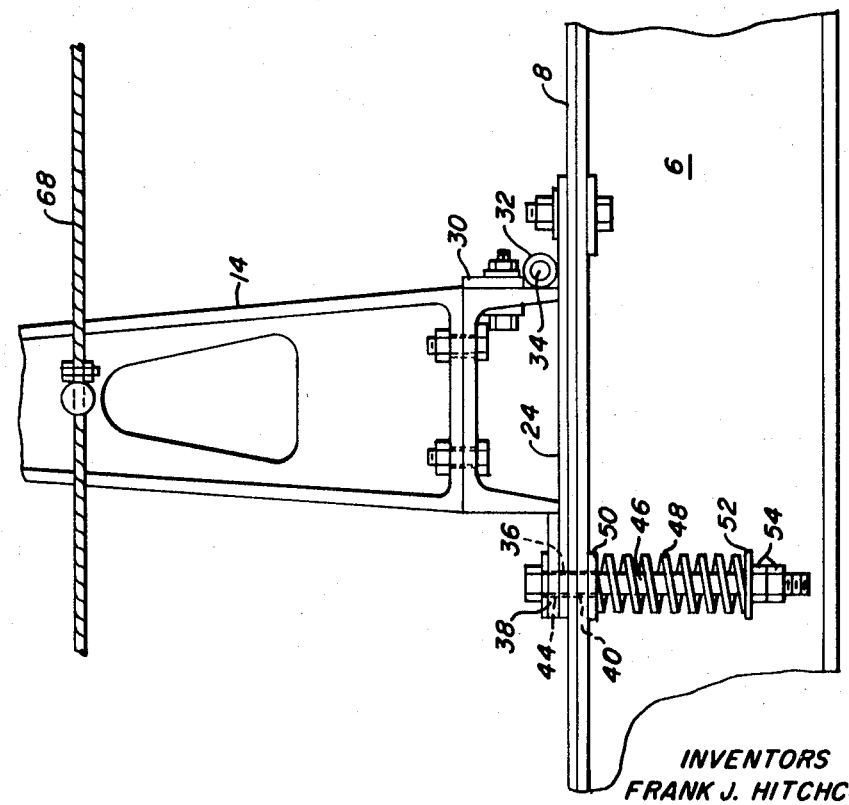

CONVEYOR BELT PROTECTION DEVICE

This invention relates to a conveyor belt protection device and more particularly to a device located in the conveyor loading zone. Conveyor belting, which is generally made of rubber, is subject to damage from various causes. This is especially true when handling coal, ore or other materials which may contain tools, bars large rocks, pieces of steelplate or the like. These items can puncture the belt and/or become lodged or caught on parts of the conveyor, thus resulting in long tears of the belt or other damage. Extreme overloads or large pieces of material also cause temporary bulges in the belt which may become caught on a conveyor part and result in holes in the belt. This danger is most likely to occur at the loading zone and, unless the danger is quickly seen and recognized and the conveyor stopped, the damages to the belt mentioned above will result.

It is therefore an object of our invention to provide a safety device for a belt conveyor which will automatically stop the conveyor when there is an excessive overload.

Another object is to provide such a device that can be readily installed on existing belt conveyors.

These and other objects will be more apparent after referring to the following specification and attached drawings, in which:

FIG. 1 is a side elevation of a portion of a conveyor incorporating our invention;

FIG. 2 is a view taken on the line II—II of FIG. 1;

FIG. 3 is an enlarged view of a portion of FIG. 1;

FIG. 4 is an end view of FIG. 3;

FIG. 5 is a view taken on the line V—V of FIG. 1; and

Figure 6:
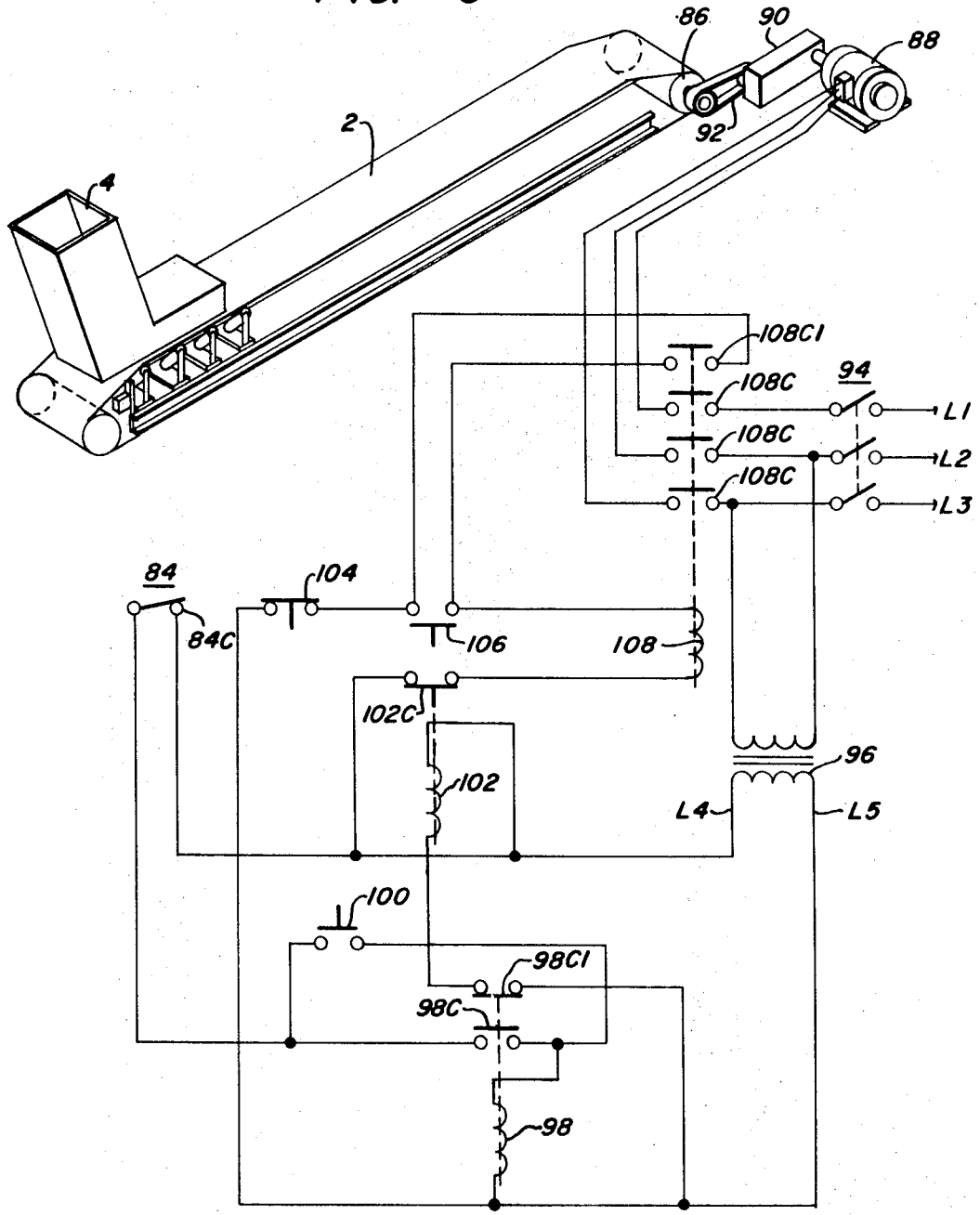
FIG. 6 is a schematic view of the conveyor and the electrical control circuit for the operation thereof.

Referring more particularly to the drawings, reference numeral 2 indicates an endless belt conveyor having a loading chute 4 associated therewith. While shown as a horizontal troughed conveyor our invention may be used also with a flat conveyor or one arranged on a slope. The conveyor 2 includes spaced-apart channels 6 having a baseplate 8 supported on their upper flanges, thus forming a conveyor table 10. Mounted on the conveyor table 10 beneath the chute 4 are a plurality of idler roll assemblies 12. While four assemblies 12 are shown in FIG. 1 the number may vary. Even one such assembly is sufficient, but more than one is preferred. Each assembly 12 consists of vertical end supports 14 between which are supported rolls 16, 18 and 20. The parts so far described are conventional According to our invention we provide a hinge 22 at each end of each assembly 12. Each hinge 22 includes a horizontal plate 24 resting on plate 8 and supporting the end support 14. The end of the plate 24 extending beyond the end support 14 on the side away from the direction of approach of belt 26 has a central pipe 28 welded thereto with its axis substantially parallel to the axis of roll 18. A vertical plate 30 has two spaced-apart aligned pipes 32 welded thereto. The plate 30 is bolted or otherwise fastened to the exit side of end support 14 with the pipes 32 aligned with pipe 28. A pin 34 passing trough the pipes 28 and 32 complete the hinge. The end of plate 24 on the exit side of support 14 is bolted or otherwise secured to the top of table 10. The end of plate 24 on the approach side of support 14 has two slots 36 therethrough elongated in the direction of belt travel. A plate 38 is welded to the approach side of support 14 and rests on plate 24. The table 10 and plate 38 have slots 40 and 44 therein aligned with slots 36. A bolt 46 passes through each set of aligned slots 36, 40 and 44 with a spring 48 surrounding each bolt. The top end of spring 48 bears against a beveled washer 50 and its bottom end bears against a washer 52 held in position by nuts 54.

A fixed idler assembly 56 is mounted on the approach side of assemblies 12. The construction of assembly 56 is the same as that of assemblies 12 except that it is secured directly to table 10 instead of being hinged thereto. A switch support 58 is located between idler assembly 56 and the first hinged idler assembly 12 and is secured to table 10 by means of a hinge 60 having its pivot axis parallel to those of hinges 22. The support 58 has two spaced-apart holes 62 and 64 therethrough. A spring 66 has one end secured in hole 62 and its other end secured to idler assembly 56. One end of a wire rope 68 passes through hole 64 and is attached to support 58 by means of clamp 70. Each of the assemblies 12 has a hole 72 in its left end support 14 as seen in FIG. 2 at substantially the same distance above table 10 as hole 64. A guide 74 is supported on each assembly 12 by means of a threaded portion 76 which passes through hole 72 and has a nut 78 threaded thereon. Each guide 74 has a hole 80 therethrough for receiving rope 68. A rope clamp 82 is attached to the rope 68 adjacent each guide 74 on the exit side thereof. A mercury switch 84 is mounted on support 58.

As shown in FIG. 6 the switch 84 has a contact 84c which is closed when the switch support 58 is in its normal upright position. The conveyor 2 includes a drive roll 86 at one end which is driven from motor 88 through gearbox 90 and belt 92. The motor 88 receives power from three-phase powerlines L1, L2, L3 through switch 94. Control power L4, L5 may be obtained from powerlines L2, L3 through transformer 96. A relay coil 98 having normally open contact 98c and normally closed contact 98cl is connected to powerlines L4, L5 in series with contacts 84c and 98c. A rest switch 100 is connected in parallel with contact 98c. Contact 98cl is connected to powerlines L4, L5 in series with relay coil 102 having a normally closed contact 102c. Contact 102c is connected to powerlines L4, L5 in series with stop switch 104, start switch 106, and relay coil 108 having normally open contacts 108c in powerlines L1, L2, and L3 and normally open contact 108cl connected in parallel with switch 106. Usual protective devices (not shown) will be included in the circuits as desired.

In operation, the end supports 14 and switch support 58 are in upright position so that contact 84c is closed. Switch 94 is closed to supply power to control powerlines L4 and L5. Reset switch 100 is closed momentarily which will energize relay coil 98 thus closing its contact 98c to lock the coil 98 in. This also opens contact 98cl to deenergize relay coil 102 thus closing its contact 102c. Switch 106 is momentarily closed to energize relay coil 108 thus closing its contact 18c and 108cl. Closing of contacts 108c causes motor 88 to drive the conveyor 2 and closing of contact 108cl locks coil 108 in. If any of the end supports 14 tilt about its hinge 22, it will tilt switch support 58 by movement of wire rope 68. This will cause contact 84c to open thus deenergizing relay coil 98 and closing contact 9cl. Closing of contact 98cl will energize relay coil 102 thus opening its contact 102c which in turn will deenergize relay coil 108 to open its contacts 108c and 108cl. Opening of contacts 108c stops the motor 88 and the conveyor 2. The operator then removes any material which caught on the conveyor and caused the tilting of the end supports 14. The end supports 14 and switch support 58 are then restored to their upright position and the circuits reset as described above to restart the conveyor.

While one embodiment of our invention has been shown and described, it will be apparent that other adaptations and modifications may be made without departing from the scope of the following claims.

We claim:

1. In a conveyor having a conveyor support, a plurality of idler roll assemblies supported on said support, each assembly including at least one roll and end supports for said roll, a belt mounted on said rolls for movement thereover, fixedly loading area for supplying a load to said conveyor, and means for fixedly supporting the roll assembly on the entry side of said loading area; the improvement comprising pivot means for supporting each of a plurality of said roll assemblies in said loading area for movement of the top of said assemblies away from the direction of belt approach, each of said pivot means including a hinge connected to each end support of the roll assembly on the exit side thereof adjacent its lower end; a switch support pivotally supported on said table between the fixed roll assembly at the entry end of said loading area and the adjacent pivoted roll assembly, said switch support having a switch mounted thereon; and switch actuating means including a guide secured to each of said pivoted roll assemblies, each of said guides having a hole therethrough in alignment with the holes in the other guides, a tension member passing through the aligned holes in said guides, means fastening one end of said tension member to said switch support, and means secured to said tension member adjacent each of said guides on the exit side thereof whereby pivoted movement of any of said pivotally supported idler roll assemblies will move said switch support and actuate said switch.

2. The combination of claim 1 in which said conveyor support is a table, and said pivot means includes an upwardly extending plate secured to said end support on the exit side thereof adjacent its lower end, a second plate resting on said table beneath said end support and extending from both sides thereof, and means pivotally connecting said plates, means fastening the exit end of said second plate to said table, said second plate having a hole therethrough on the belt approach side, a third plate secured to the approach side of said end support adapted to contact the top of said second plate, said third plate and table having holes therein aligned with the hole in said second plate, a bolt extending through said aligned holes downwardly below the top of said table, and a spring surrounding said bolt with its top end supported beneath the top of said table and its bottom end supported adjacent the bottom end of said bolt.

3. The combination of claim 2 including a spring having one end secured to said switch support and the other end secured to said fixed roll assembly.

4. The combination of claim 3 in which said tension member is a wire rope, and the means secured thereto is a rope clamp.

5. The combination of claim 4 in which said switch is a mercury switch adapted to be closed in one position of said support and open in another position thereof.

6. The combination of claim 1 including a spring having one end secured to said switch support and the other end secured to said fixed roll assembly.

7. The combination of claim 6 in which said tension member is a wire rope, and the means secured thereto is a rope clamp.

8. The combination of claim 7 in which said switch is a mercury switch adapted to be closed in one position of said support and open in another position thereof.